US010386674B2

(12) United States Patent
Lee et al.

(10) Patent No.: US 10,386,674 B2
(45) Date of Patent: Aug. 20, 2019

(54) LIGHT-EMITTING FILM

(71) Applicant: LG CHEM, LTD., Seoul (KR)

(72) Inventors: Seong Min Lee, Daejeon (KR); Su Young Ryu, Daejeon (KR); Sun Kug Kim, Daejeon (KR); Moon Soo Park, Daejeon (KR); Hyuk Yoon, Daejeon (KR); Tae Gyun Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/561,874

(22) PCT Filed: Mar. 28, 2016

(86) PCT No.: PCT/KR2016/003123
§ 371 (c)(1),
(2) Date: Sep. 26, 2017

(87) PCT Pub. No.: WO2016/159608
PCT Pub. Date: Oct. 6, 2016

(65) Prior Publication Data
US 2018/0113361 A1    Apr. 26, 2018

(30) Foreign Application Priority Data

Mar. 27, 2015 (KR) .......... 10-2015-0043449
Mar. 31, 2015 (KR) .......... 10-2015-0045633

(51) Int. Cl.
F21V 8/00 (2006.01)
G02F 1/1335 (2006.01)
(Continued)

(52) U.S. Cl.
CPC ..... *G02F 1/133602* (2013.01); *G02B 6/0003* (2013.01); *G02B 6/005* (2013.01);
(Continued)

(58) Field of Classification Search
CPC ....... C09K 11/02; C09K 11/883; C09K 11/08; C09K 11/025; G02B 6/0035; G02B 6/0003; G02B 6/005; G02B 6/0055; G02B 6/0065; C08K 3/36; C08K 11/00; H01L 33/56; H01L 33/501; H01L 33/502;
(Continued)

(56) References Cited

U.S. PATENT DOCUMENTS

2015/0177438 A1 * 6/2015 Drolet .................. G02B 6/0035
349/65
2017/0200871 A1 * 7/2017 Kwon ...................... C08K 3/36

FOREIGN PATENT DOCUMENTS

EP        0885258 B1 * 6/2002 ............. B32B 27/18
JP       2006028524       2/2006
(Continued)

OTHER PUBLICATIONS

Translation for KR-2014-0114163.*

*Primary Examiner* — Thien T Mai
(74) *Attorney, Agent, or Firm* — Dentons US LLP

(57) ABSTRACT

The present application relates to a light-emitting film, an illumination device, and a display device. The present application may provide a light-emitting film and the use thereof, the light-emitting film being capable of effectively generating a desired light, such as white light, and stably maintaining the performance thereof for a long period of time.

15 Claims, 4 Drawing Sheets

(51) Int. Cl.
*H05B 33/14* (2006.01)
*H05B 33/20* (2006.01)
*H05B 33/22* (2006.01)

(52) U.S. Cl.
CPC ............ *H05B 33/14* (2013.01); *H05B 33/20* (2013.01); *H05B 33/22* (2013.01); *G02B 6/0055* (2013.01); *G02B 6/0065* (2013.01); *G02F 2001/133614* (2013.01)

(58) Field of Classification Search
CPC ... G02F 1/133602; G02F 2001/133614; H05B 33/22; H05B 33/20; H05B 33/14
See application file for complete search history.

(56) References Cited

FOREIGN PATENT DOCUMENTS

| | | |
|---|---|---|
| KR | 1020110038191 | 4/2011 |
| KR | 1020110048397 | 5/2011 |
| KR | 1020120074899 | 7/2012 |
| KR | 1020130112990 | 10/2013 |
| KR | 1020140088361 | 7/2014 |
| KR | 1020140114163 | 9/2014 |

\* cited by examiner

[Figure 1]
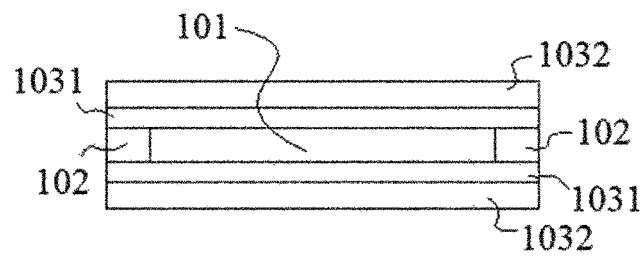
[Figure 2]
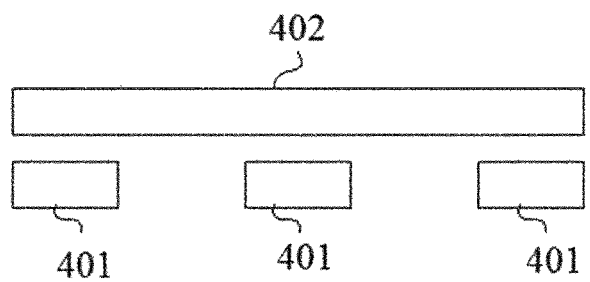
[Figure 3]
[Figure 4]
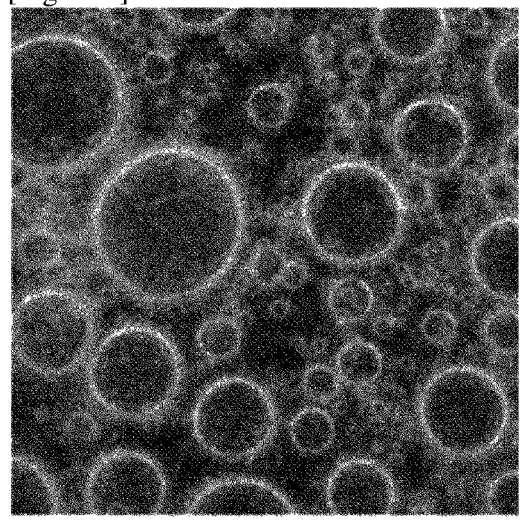

[Figure 5]
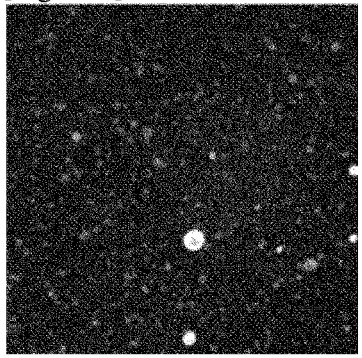
[Figure 6]
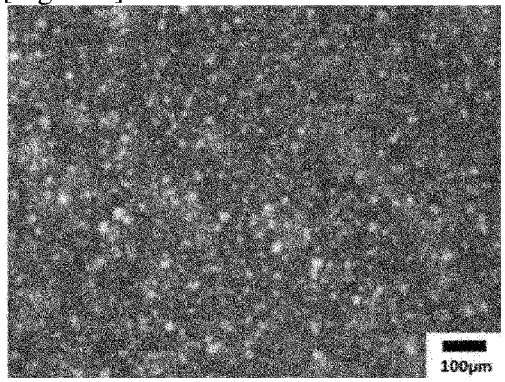
[Figure 7]
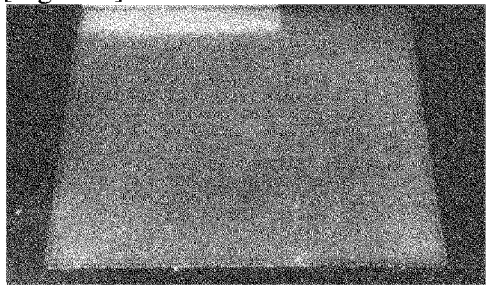
[Figure 8]
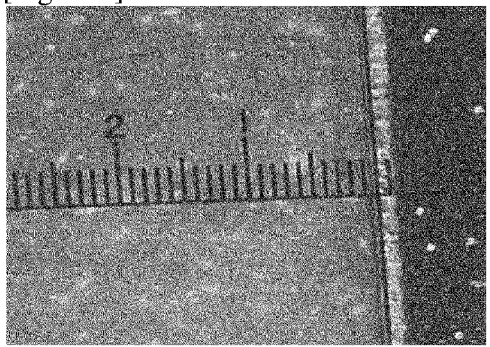

[Figure 9]
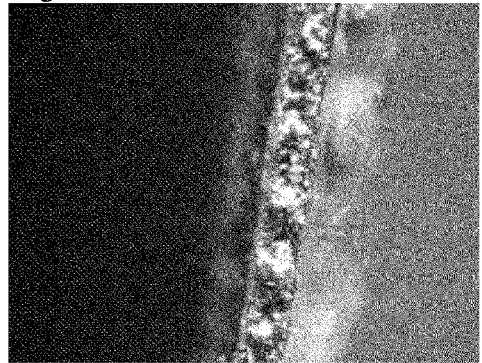
[Figure 10]
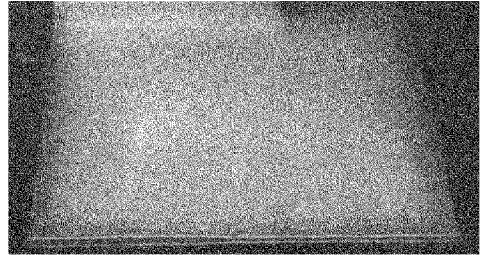
[Figure 11]
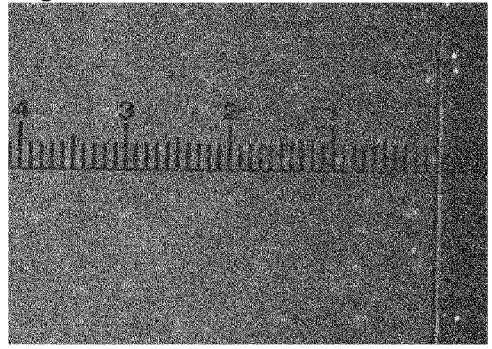

[Figure 12]
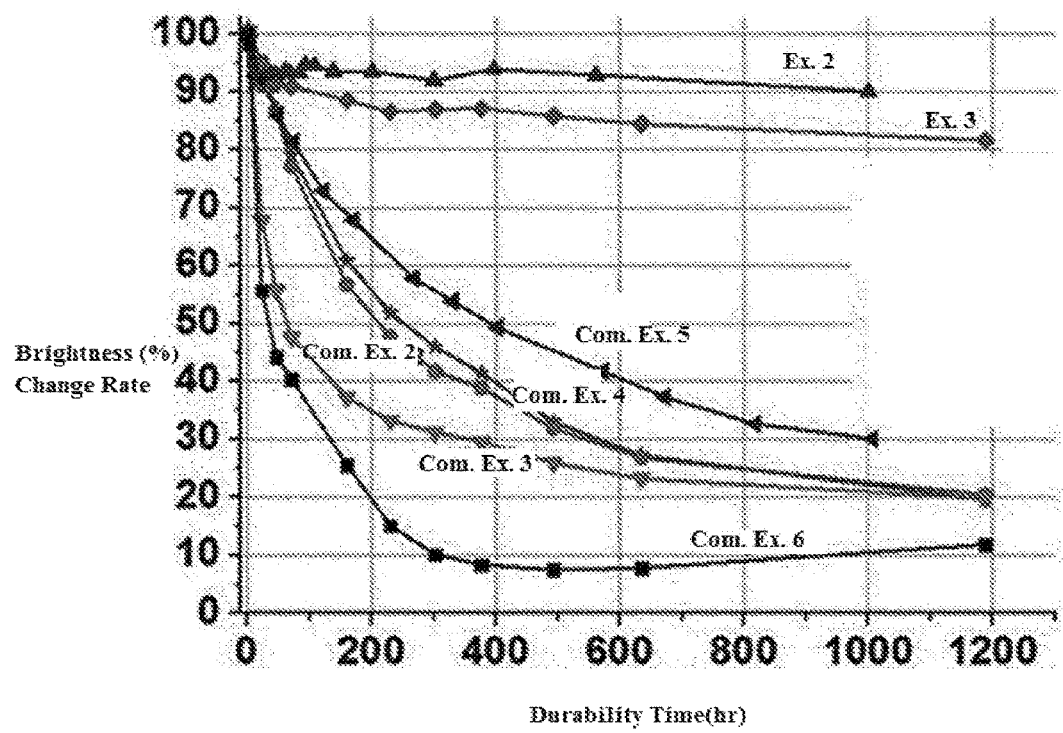

LIGHT-EMITTING FILM

TECHNICAL FIELD

This application is a National Stage Application of International Application No. PCT/KR2016/003123, filed Mar. 28, 2016, and claims the benefit of Korean Patent Application No. 10-2015-0045633, filed on Mar. 31, 2015, Korean Patent Application No. 10-2015-0043449, filed on Mar. 27, 2015, contents of which are incorporated herein by reference in their entirety for all purposes as if fully set forth below.

The present application relates to a light-emitting film, an illumination device and a display device.

BACKGROUND ART

Illumination devices are used in various applications. The illumination device may be, for example, a BLU (backlight unit) of a display such as an LCD (liquid crystal display), a television, a computer, a mobile phone, a smart phone, a personal digital assistant (PDA), a gaming device, an electronic reading device or a digital camera. Besides, the illumination device can be used for indoor or outdoor lighting, stage lighting, decorative lighting, accent lighting or museum lighting, and the like, as well as special wavelength lighting required for horticulture and biology.

A typical illumination device is, for example, one used as a BLU of a LCD, and the like, and there is a device which emits a white light by combining phosphors such as a blue LED (Light-emitting Diode) and a YAG (Yttrium aluminum garnet).

PRIOR ART DOCUMENTS

Patent Documents (Patent Document 1) Korean Laid-Open Patent Publication No. 2011-0048397
(Patent Document 2) Korean Laid-Open Patent Publication No. 2011-0038191

DISCLOSURE

Technical Problem

The present application provides a light-emitting film, a illumination device, and a display device. The present application can provide a light-emitting film capable of effectively producing the desired light, for example, white light, and stably maintaining the performance for a long period of time, and a use thereof.

Technical Solution

The present application relates to a light-emitting film. In the present application, the term light-emitting film may mean a film formed to be capable of emitting light. For example, the light-emitting film may be a film formed so as to be capable of absorbing light having a predetermined wavelength and emitting light having the same or different wavelength as the absorbed light.

The light-emitting film may comprise a light-emitting layer. The light-emitting layer may comprise, for example, light-emitting nanoparticles and a binder for holding the light-emitting nanoparticles.

In the present application, the term light-emitting nanoparticle may mean nanoparticles capable of emitting light. For example, the light-emitting nanoparticles may be nanoparticles formed so as to be capable of absorbing light of a predetermined wavelength and emitting light having the same or different wavelengths as the absorbed light. In the present application, the term nanoparticles may mean, as particles having a nanoscale dimension, for example, particles having an average particle size of about 100 nm or less, 90 nm or less, 80 nm or less, 70 nm or less, 60 nm or less, 50 nm or less, 40 nm or less, 30 nm or less, 20 nm or less, or about 15 nm or less. The shape of the nanoparticle is not particularly limited and may be spherical, ellipsoidal, polygonal or amorphous, and the like.

The nanostructures are called nanoparticles for convenience in the present specification, but may be also in the form of particles, and for example, may be a shape such as nanowires, nanorods, nanotubes, branched nanostructures, nanotetrapods or tripods, in which such a shape may be also included in the nanoparticles defined in the present application. In the present application, the term "nanostructure" may include similar structures having at least one region or characteristic dimension having a dimension of less than about 500 nm, less than about 200 nm, less than about 100 nm, less than about 50 nm, less than about 20 nm or less than about 10 nm. In general, regions or characteristic dimensions may exist along the shortest axis of the structure, but are not limited thereto.

For example, the light-emitting nanoparticles may be nanoparticles (hereinafter, possibly referred to as green particles) capable of absorbing light of any one wavelength within a range of 420 to 490 nm and emitting light of any one wavelength within a range of 490 to 580 nm and/or nanoparticles (hereinafter, possibly referred to as red particles) capable of absorbing light of any one wavelength within a range of 450 to 490 nm and emitting light of any one wavelength within a range of 580 to 780 nm. For example, in order to obtain a light-emitting film capable of emitting white light, the red particles and the green particles may be included in the light-emitting layer together in an appropriate ratio. In one example, the light-emitting layer of the light-emitting film capable of emitting white light may comprise 300 to 1500 parts by weight of green particles relative to 100 parts by weight of the red particles. The light-emitting nanoparticles can be used without any particular limitation as long as they exhibit such an action. A representative example of such nanoparticles may be exemplified by nanostructures referred to as so-called quantum dots.

The nanostructure may be, for example, substantially crystalline, substantially monocrystalline, polycrystalline or amorphous, or a combination of the above structure.

Quantum dots that can be used as the light-emitting nanoparticles can be prepared in any known manner. For example, suitable methods for forming quantum dots have been disclosed in U.S. Pat. No. 6,225,198, US Laid-open Patent Publication No. 2002-0066401, U.S. Pat. Nos. 6,207, 229, 6,322,901, 6,949,206, 7,572,393, 7,267,865, 7,374,807 or 6,861,155, and the like, and in addition to these methods, various other known methods can be applied to the present application.

Quantum dots or other nanoparticles of the present application can be formed using any suitable material, for example, an inorganic conductive or semiconductive material as an inorganic material. Suitable semiconductor materials may be exemplified by Group II-VI, III-V, IV-VI and IV semiconductors. More specifically, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and suitable combinations of two or more of the semiconductors can be exemplified, without being limited thereto.

In one example, the semiconductor nanocrystals or other nanostructures may also comprise a dopant such as a p-type dopant or an n-type dopant. The nanoparticles that may be used in the present application may also comprise II-VI or III-V semiconductors. Examples of II-VI or III-V semiconductor nanocrystals and nanostructures include any combination of a periodic table Group II element such as Zn, Cd, and Hg with a periodic table Group VI element such as S, Se, Te and Po; and any combination of a Group III element such as B, Al, Ga, In, and Tl with a Group V element such as N, P, As, Sb and Bi, but are not limited thereto. In other examples, suitable inorganic nanostructures may comprise metal nanostructures and a suitable metal may be exemplified by Ru, Pd, Pt, Ni, W, Ta, Co, Mo, Ir, Re, Rh, Hf, Nb, Au, Ag, Ti, Sn, Zn, Fe, or FePt, and the like, without being limited thereto.

The light-emitting nanoparticle, for example, for example, the quantum dot, may have a core-shell structure. Exemplary materials capable of forming the wavelength conversion particles of the core-cell structure include Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$ and any combination of two or more of these materials, but are not limited thereto. Exemplary core-cell wavelength conversion particles (core/cell) applicable in the present application include, but are not limited to, CdSe/ZnS, InP/ZnS, PbSe/PbS, CdSe/CdS, CdTe/CdS or CdTe/ZnS, and the like.

The specific kind of the light-emitting nanoparticles is not particularly limited and may be suitably selected in consideration of the desired light emission characteristics.

In one example, the light-emitting nanoparticles, such as quantum dots, may be surrounded by one or more ligands or barriers. The ligand or barrier may be advantageous in improving the stability of light-emitting nanoparticles such as quantum dots and protecting light-emitting nanoparticles from harmful external conditions, including high temperature, high intensity, external gas or moisture, and the like. In addition, as described below, the light-emitting nanoparticles may exist only in any one region of the matrix or the emulsion region, and in order to obtain such a light-emitting layer, the characteristics of the ligand or barrier may be also selected so that it has compatibility only in any one region of the matrix and the emulsion region.

In one example, the light-emitting nanoparticles, such as quantum dots, may comprise ligands conjugated, cooperated, associated or attached to their surfaces. Ligands capable of exhibiting characteristics suitable for the surfaces of light-emitting nanoparticles such as quantum dots and methods for forming the ligand are known, and such a method can be applied without limitation in the present application. Such materials or methods are disclosed, for example, in US Laid-open Patent Publication No. 2008-0281010, US Laid-open Patent Publication No. 2008-0237540, US Laid-open Patent Publication No. 2010-0110728, US Laid-open Patent Publication No. 2008-0118755, U.S. Pat. Nos. 7,645,397, 7,374,807, 6,949,206, 7,572,393, or 7,267,875, and the like, but are not limited thereto. In one example, the ligand may be formed by a molecule or polymer having an amine group (oleylamine, triethylamine, hexylamine, napthylamine, etc.), a molecule or polymer having a carboxyl group (oleic acid, etc.), a molecule or polymer having a thiol group (butanethiol, hexanethiol, dodecanethiol, etc.), a molecule or polymer having a pyridine group (pyridine, etc.), a molecule having a phosphine group (triphenylphosphine, etc.), a molecule having an oxidized phosphine group (trioctylphosphine oxide, etc.), a molecule having a carbonyl group (alkyl ketone, etc.), a molecule or polymer having a benzene ring (benzene, styrene, etc.), a molecule or polymer having a hydroxyl group (butanol, hexanol, etc.) or a molecule or polymer having a sulfone group (sulfonic acid, etc.).

The ratio of the light-emitting nanoparticles in the light-emitting layer is not particularly limited, and for example, may be selected in an appropriate range in consideration of the desired optical characteristics. In one example, the light-emitting nanoparticles may be present in the light-emitting layer at a concentration of about 0.05 to 20 wt %, 0.05 to 15% by weight, 0.1 to 15% by weight, or 0.5 to 15% by weight, but are not limited thereto.

In one example, the binder holding the light-emitting nanoparticles may include two regions phase-separated from each other. In the present application, the term "phase-separated regions" may mean, for example, as regions formed by two regions that do not mix with each other, such as a relatively hydrophobic region and a relatively hydrophilic region, regions formed in such a state that it can be confirmed that they are separated from each other. Hereinafter, for convenience of explanation, any one region of two regions of the binder, which are phase-separated, may be referred to as a first region and the other region may be referred to as a second region. When the binder is an emulsion shape, any one region of the first and second regions may be a continuous phase and the other region may be a dispersed phase.

The first region of the first and second regions may be a hydrophilic region and the second region may be a hydrophobic region. In the present application, hydrophilicity and hydrophobicity for distinguishing the first and second regions are relative concepts to each other, and the absolute criterion of hydrophilicity and hydrophobicity is not particularly limited, as long as it can be confirmed that the two regions are distinguished from each other in the light-emitting layer.

The ratio of the hydrophilic first region and the hydrophobic second region can be selected in consideration of, for example, the ratio of the light-emitting nanoparticles, the adhesion with other layers such as a blocking film, the production efficiency of the phase separation structure, or physical properties for filming, and the like. For example, the light-emitting layer may comprise 10 parts by weight to 100 parts by weight of the second region relative to 100 parts by weight of the first region. In another example, the light-emitting layer may comprise 50 to 95 parts by weight of the first region and 5 to 50 parts by weight of the second region. Conversely, the light-emitting layer may also comprise 50 to 95 parts by weight of the second region and 5 to 50 parts by weight of the first region. In the present application, the term "part by weight" means a ratio of weight between components unless otherwise specified. In addition, the ratio of weight of the first and second regions may mean a ratio of weight of each region itself; a ratio of the total weight of all components contained in each region; a ratio of weight between components contained as main components of each region or a ratio of weight of materials used to form each of the regions. For example, the light-emitting layer may be formed by mixing a hydrophilic polymerizable composition and a relatively hydrophobic polymerizable composition and polymerizing them as described below, and in this case, the ratio of weight of each of the regions may mean a ratio of weight of each of the polymerizable compositions or a ratio of weight between the hydrophilic polymerizable compound and the hydrophobic polymerizable compound as the main components contained in each composition. Here, the hydrophilic polymerizable composition may mean a composition containing a hydrophilic polymerizable compound as a main component, and the hydrophobic polymerizable composition may mean a composition containing a hydrophobic polymerizable compound as a main component. The kind of the polymerizable compound is not particularly limited and may be, for example, a radically polymerizable compound. In the present application, being contained as a main component may mean a case in which the ratio of weight of the component contained as a main component is 55% by weight or more, 60% by weight or more, 65% by weight or more, 70% by weight or more, 75% by weight or more, 80% by weight or more, 85% by weight or more, or 95% by weight or more based on the total weight. In the present application, the criterion for distinguishing hydrophilicity and hydrophobicity in the hydrophilic polymerizable compound and the hydrophilic polymerizable compound is not particularly limited, for example, as long as both of the compounds can form the phase-separated regions as described above, when they have been mixed with each other, while being relatively hydrophilic or hydrophobic from each other. In one example, the distinction between hydrophilicity and hydrophobicity can be performed by a so-called solubility parameter. In the present application, the solubility parameter may refer to the solubility parameter of a homopolymer formed by polymerization of the corresponding hydrophilic or hydrophobic polymerizable compound, thereby determining the degree of hydrophilicity and hydrophobicity of the corresponding compound. The manner of obtaining the solubility parameter is not particularly limited and may follow a method known in the art. For example, the parameter may be calculated or obtained according to a method known as a so-called HSP (Hansen solubility parameter). In the present application, the hydrophobic polymerizable compound may mean a polymerizable compound capable of forming a polymer having the solubility parameter of less than about 10 $(cal/cm^3)^{1/2}$ by polymerization, and the hydrophilic polymerizable compound may mean a polymerizable compound capable of forming a polymer having the solubility parameter of about 10 $(cal/cm^3)^{1/2}$ or more. In another example, the solubility parameter of the polymer formed by the hydrophobic polymerizable compound may be 3 $(cal/cm^3)^{1/2}$ or more, 4 $(cal/cm^3)^{1/2}$ or more, or about 5 $(cal/cm^3)^{1/2}$. In another example, the solubility parameter of the polymer formed by the hydrophilic polymerizable compound may be about 11 $(cal/cm^3)^{1/2}$ or more, 12 $(cal/cm^3)^{1/2}$ or more, 13 $(cal/cm^3)^{1/2}$ or more, 14 $(cal/cm^3)^{1/2}$ or more, or 15 $(cal/cm^3)^{1/2}$ or more. In another example, the solubility parameter of the polymer formed by the hydrophilic polymerizable compound may be about 40 $(cal/cm^3)^{1/2}$ or less, about 35 $(cal/cm^3)^{1/2}$ or less, or about 30 $(cal/cm^3)^{1/2}$ or less. The difference in solubility parameters of the hydrophobic and hydrophilic compounds can be controlled for realizing a suitable phase separation structure or emulsion structure.

In one example, the difference in solubility parameters of the hydrophilic and hydrophobic polymerizable compounds or the polymers formed by each of the hydrophilic and hydrophobic polymerizable compounds may be 5 $(cal/cm^3)^{1/2}$ or more, 6 $(cal/cm^3)^{1/2}$ or more, 7 $(cal/cm^3)^{1/2}$ or more, or about 8 $(cal/cm^3)^{1/2}$ or more. The difference is a value obtained by subtracting a small value from a large value among the solubility parameters. The upper limit of the difference is not particularly limited. The larger the difference in solubility parameters, the more appropriate phase separation structure or emulsion structure can be formed. The upper limit of the difference may be, for example, 30 $(cal/cm^3)^{1/2}$ or less, 25 $(cal/cm^3)^{1/2}$ or less, or about 20 $(cal/cm^3)^{1/2}$ or less. In the case where any physical property described in this specification is a physical property varying with temperature, the physical property may mean a physical property at room temperature. The term room temperature is a natural temperature, which is not heated or cooled, and for example, may mean any one temperature within a range of about 10° C. to 30° C., that is, about 23° C. or about 25° C.

In one example, the light-emitting layer or the binder may be an emulsion type layer. On the other hand, in the present application, the term emulsion type layer may mean a layer having a shape that any one region of two or more phases (for example, the first and second regions) which are not mixed with each other forms a continuous phase in the layer, and the other region is dispersed in the continuous phase to form a dispersed phase. Here, the continuous phase and the dispersed phase may be solid, semi-solid or liquid, respectively, and may be the same phase or different phases from each other. Generally, an emulsion is a term mainly used for two or more liquid phases which do not mix with each other, but the term emulsion in the present application does not necessarily mean an emulsion formed by two or more liquid phases.

In one example, the light-emitting layer may comprise a matrix forming the continuous phase, and may comprise an emulsion region, which is a dispersed phase dispersed within the matrix. Here, the matrix may be any one region (for example, the first region) of the above-described first and second regions, and the emulsion region, which is the dispersed phase, may be the other region (for example, the second region) of the first and second regions.

The emulsion region may be in the form of particles. That is, the emulsion region may be dispersed within the matrix in the form of particles. In this case, the particle shape of the emulsion region is not particularly limited, and may be roughly spherical, ellipsoidal, polygonal or amorphous, and the like. The average diameter of the particle shape may be in a range of about 1 μm to 200 μm, in a range of about 1 μm to 50 μm, or in a range of about 50 μm to 200 μm. The size of the particle shape can be controlled by adjusting the ratio of the material forming the matrix and the emulsion region, or by using a surfactant or the like.

The ratio of the matrix and the emulsion region in the light-emitting layer may be selected, for example, in consideration of the ratio of the light-emitting nanoparticles to be included in the light-emitting layer, the adhesion with other layers such as a blocking film and a barrier film, the production efficiency of an emulsion structure as a phase separation structure, or the physical properties required for filming, and the like. For example, the light-emitting layer may comprise 5 to 40 parts by weight of the emulsion region relative to 100 parts by weight of the matrix. The ratio of the emulsion region may be 10 parts by weight or more, or 15 parts by weight or more relative to 100 parts by weight of the matrix. The ratio of the emulsion region may be 35 parts by weight or less relative to 100 parts by weight of the matrix. Here, the ratio of weight of the matrix and the emulsion region may mean a ratio of weight of each region itself, or a ratio of the total weight of all components contained in the region or main components or a ratio of weight of materials used to form each of the regions. For example, the matrix and the emulsion region may each comprise polymerized units of hydrophilic and hydrophobic polymerizable compounds, which are described below, and the ratio of weight may be a ratio between the polymerized units.

The light-emitting nanoparticles included in the light-emitting layer may be contained in the matrix or the emulsion region. In one example, the light-emitting nanoparticles may be contained only in any one region of the matrix and emulsion region, and may not be substantially contained in the other region. In the present application, it may mean, for example, the case in which the weight ratio of the light-emitting nanoparticles contained in the relevant region is 10% or less, 9% or less, 8% or less, 7% or less, 6% or less, 5% or less, 4% or less, 3% or less, 2% or less, 1% or less, 0.5% or less, or 0.1% or less based on the total weight of the nanoparticles contained in the light-emitting layer.

The light-emitting nanoparticles may be substantially contained in the emulsion region of the matrix and the emulsion region. In this case, the light-emitting nanoparticles may not be substantially contained in the matrix. Therefore, in the above case, the ratio of the light-emitting nanoparticles contained in the emulsion region may be 90% by weight or more, 91% by weight or more, 92% by weight or more, 93% by weight or more, 94% by weight or more, 95% by weight or more, 96% by weight or more, 97% by weight or more, 98% by weight or more, 99% by weight or more, 99.5% by weight or more, or 99.9% by weight or more based on the total weight of the light-emitting nanoparticles contained in the light-emitting layer.

If two regions phase-separated in the light-emitting layer are formed and the light-emitting nanoparticles are substantially located only in any one region of the two regions, physical properties suitable for filming can be ensured, adhesion between the light-emitting layer and other layers such as a blocking film to be described below is advantageously ensured, and other factors which may adversely affect physical properties of the nanoparticles such as an initiator and a cross-linking agent in a region where the light-emitting nanoparticles exist on forming the light-emitting film, can be more effectively controlled to form a film having excellent durability.

Any one region of the matrix and the emulsion region may comprise a hydrophilic polymer and the other region may comprise a hydrophobic polymer. Here, as described above, the hydrophilic polymer may mean a polymer having an HSP (Hansen solubility parameter) of 10 $(cal/cm^3)^{1/2}$ or more, and the hydrophobic polymer may mean a polymer having an HSP of less than 10 $(cal/cm^3)^{1/2}$. In another example, the solubility parameter of the hydrophobic polymer may be 3 $(cal/cm^3)^{1/2}$ or more, 4 $(cal/cm^3)^{1/2}$ or more, or about 5 $(cal/cm^3)^{1/2}$ or more. In another example, the solubility parameter of the hydrophilic polymer may be about 11 $(cal/cm^3)^{1/2}$ or more, 12 $(cal/cm^3)^{1/2}$ or more, 13 $(cal/cm^3)^{1/2}$ or more, 14 $(cal/cm^3)^{1/2}$ or more, or 15 $(cal/cm^3)^{1/2}$ or more. In another example, the solubility parameter of the hydrophilic polymer may be about 40 $(cal/cm^3)^{1/2}$ or less, about 35 $(cal/cm^3)^{1/2}$ or less, or about 30 $(cal/cm^3)^{1/2}$ or less. The difference in solubility parameters of the hydrophobic and hydrophilic polymers can be controlled for realizing a suitable phase separation structure or emulsion structure. In one example, the difference in solubility parameters of the hydrophilic and hydrophobic polymers may be 5 $(cal/cm^3)^{1/2}$ or more, 6 $(cal/cm^3)^{1/2}$ or more, 7 $(cal/cm^3)^{1/2}$ or more, or about 8 $(cal/cm^3)^{1/2}$ or more. The difference is a value obtained by subtracting a small value from a large value among the solubility parameters. The upper limit of the difference is not particularly limited. The larger the difference in solubility parameters, the more appropriate phase separation structure or emulsion structure can be formed. The upper limit of the difference may be, for example, 30 $(cal/cm^3)^{1/2}$ or less, 25 $(cal/cm^3)^{1/2}$ or less, or about 20 $(cal/cm^3)^{1/2}$ or less. In one example, the matrix may comprise a hydrophilic polymer and the emulsion region may comprise a hydrophobic polymer.

The matrix may be formed by polymerizing the hydrophilic polymerizable compound, for example, a radically hydrophilic polymerizable compound. In this case, the matrix may comprise a polymerized unit of a compound of Formula 1 below, a compound of Formula 2 below, a compound of Formula 3 below, a compound of Formula 4 below, a radically nitrogen-containing polymerizable compound, a radically polymerizable compound comprising acrylic acid, methacrylic acid or a salt moiety. In the present application, the term polymerized unit of a given compound may mean a unit formed by polymerizing the given compound.

[Formula 1]

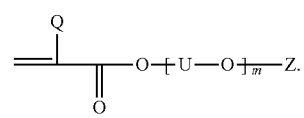

In Formula 1, Q is hydrogen or an alkyl group, U is an alkylene group, Z is hydrogen, an alkoxy group, an epoxy group or a monovalent hydrocarbon group, and m is any number.

[Formula 2]

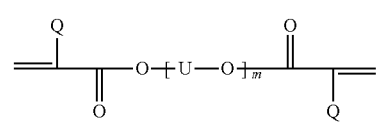

In Formula 2, Q is hydrogen or an alkyl group, U is an alkylene group, and m is any number.

[Formula 3]

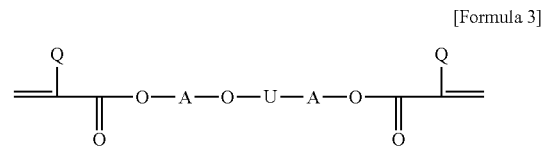

In Formula 3, Q is hydrogen or an alkyl group, A is an alkylene group which may be substituted with a hydroxyl group, and U is an alkylene group.

[Formula 4]

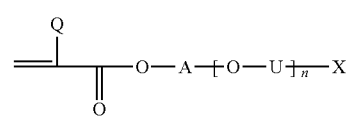

In Formula 4, Q is hydrogen or an alkyl group, A and U are each independently an alkylene group, and X is a hydroxyl group or a cyano group.

In the present application, the term "alkylene group" may mean an alkylene group having 1 to 20 carbon atoms, 1 to 16 carbon atoms, 1 to 12 carbon atoms, 1 to 8 carbon atoms or 1 to 4 carbon atoms, unless otherwise specified. The alkylene group may be linear, branched or cyclic. Also, the alkylene group may be optionally substituted with one or more substituents.

In the present application, the term "epoxy group" may mean cyclic ether having three ring constituent atoms or a compound containing the cyclic ether or a monovalent residue derived therefrom, unless otherwise specified. As the epoxy group, a glycidyl group, an epoxyalkyl group, a glycidoxyalkyl group or an alicyclic epoxy group and the like can be exemplified. Here, the alicyclic epoxy group may mean a monovalent residue derived from a compound including an aliphatic hydrocarbon ring structure and a structure in which two carbon atoms forming the aliphatic hydrocarbon ring also form an epoxy group. As the alicyclic epoxy group, an alicyclic epoxy group having 6 to 12 carbon atoms can be exemplified, and for example, a 3,4-epoxycyclohexylethyl group and the like can be exemplified.

In the present application, the term "alkoxy group" may mean an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy group may be linear, branched or cyclic. In addition, the alkoxy group may be optionally substituted with one or more substituents.

In the present application, the term "alkyl group" may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be linear, branched or cyclic. In addition, the alkyl group may be optionally substituted with one or more substituents.

In the present application, the term "monovalent hydrocarbon group" may mean a monovalent residue derived from a compound consisting of carbon and hydrogen or a derivative of such a compound, unless otherwise specified. For example, the monovalent hydrocarbon group may contain 1 to 25 carbon atoms. As the monovalent hydrocarbon group, an alkyl group, an alkenyl group, an alkynyl group or an aryl group and the like can be exemplified.

In the present application, the term "alkenyl group" may mean an alkenyl group having 2 to 20 carbon atoms, 2 to 16 carbon atoms, 2 to 12 carbon atoms, 2 to 8 carbon atoms, or 2 to 4 carbon atoms, unless otherwise specified. The alkenyl group may be linear, branched or cyclic and may optionally be substituted with one or more substituents.

In the present application, the term "alkynyl group" may mean an alkynyl group having 2 to 20 carbon atoms, 2 to 16 carbon atoms, 2 to 12 carbon atoms, 2 to 8 carbon atoms, or 2 to 4 carbon atoms, unless otherwise specified. The alkynyl group may be linear, branched or cyclic and may optionally be substituted with one or more substituents.

In the present application, the term "aryl group" may mean a monovalent residue derived from a compound containing a structure in which a benzene ring or two or more benzene rings are condensed or bonded, or a derivative thereof, unless otherwise specified. The range of the aryl group may include a so-called aralkyl group or an arylalkyl group as well as a functional group ordinarily called an aryl group. The aryl group may be, for example, an aryl group having 6 to 25 carbon atoms, 6 to 21 carbon atoms, 6 to 18 carbon atoms or 6 to 12 carbon atoms. The aryl group may be exemplified by a phenyl group, a phenoxy group, a phenoxyphenyl group, a phenoxybenzyl group, dichlorophenyl, chlorophenyl, a phenylethyl group, a phenylpropyl group, a benzyl group, a tolyl group, a xylyl group or a naphthyl group, and the like. In addition, the aryl group may be optionally substituted with one or more substituents.

In the present application, the substituent which may be optionally substituted in the alkoxy group, alkylene group, epoxy group or monovalent hydrocarbon group can be exemplified by halogen such as chlorine or fluorine, an epoxy group such as a glycidyl group, an epoxyalkyl group, a glycidoxyalkyl group or an alicyclic epoxy group, an acryloyl group, a methacryloyl group, an isocyanate group, a thiol group, or a monovalent hydrocarbon group, and the like, but is not limited thereto.

In Formulas 1, 2 and 4, m and n are any number and can be, for example, each independently a number within a range of 1 to 20, 1 to 16 or 1 to 12.

As the radically polymerizable nitrogen-containing compound, a radically polymerizable amide group-containing compound, a radically polymerizable amino group-containing compound, a radically polymerizable imide group-containing compound, or a radically polymerizable cyano group-containing compound and the like can be used. The radically polymerizable amide group-containing compound can be exemplified by, for example, (meth)acrylamide or N,N-dimethyl (meth)acrylamide, N,N-diethyl (meth)acrylamide, N-isopropyl (meth)acrylamide, N-methylol (meth)acrylamide, diacetone (meth)acrylamide, N-vinylacetomaide, N,N'-methylenebis (meth)acrylamide, N,N-dimethylaminopropyl (meth)acrylamide, N-vinylpyrrolidone, N-vinylcaprolactam or (meth)acryloylmorpholine, and the like, the radically polymerizable amino group-containing compound can be exemplified by aminoethyl (meth)acrylate, N,N-dimethylaminoethyl (meth)acrylate or N,N-dimethylaminopropyl (meth)acrylate, and the like, the radically polymerizable imide group-containing compound can be exemplified by N-isopropylmaleimide, N-cyclohexylmaleimide or itaconimide, and the like, and the radically polymerizable cyano group-containing compound can be exemplified by acrylonitrile or methacrylonitrile, and the like, without being limited thereto.

In addition, in the radically polymerizable compound having a salt moiety, the salt of acrylic acid or methacrylic acid can be exemplified by, for example, a salt of an alkali metal including lithium, sodium and potassium, or a salt of an alkali earth metal including magnesium, calcium, strontium and barium, with the above acid, and the like, but is not limited thereto.

The matrix comprising the above polymerized units can be formed, for example, by polymerizing a hydrophilic polymerizable composition comprising a hydrophilic polymerizable compound, for example, a radically polymerizable compound and a radical initiator. Thus, the matrix may be a polymer of the hydrophilic polymerizable composition.

The kind of the radically hydrophilic polymerizable compound is not particularly limited, and for example, the above-described compounds can be used.

The kind of the radical initiator contained in the hydrophilic polymerizable composition is not particularly limited. As the initiator, a radically thermal initiator or photoinitiator capable of generating a radical such that a polymerization reaction can be induced by application of heat or irradiation of light can be used.

As the thermal initiator, for example, one or two or more of azo compounds such as 2,2-azobis-2,4-dimethylvaleronitrile (V-65, manufactured by Wako), 2,2-azobisisobutyronitrile (V-60, manufactured by Wako) or 2,2-azobis-2-methylbutyronitrile (V-59, manufactured by Wako); peroxyester compounds such as dipropyl peroxydicarbonate (Peroyl NPP, manufactured by NOF), diisopropyl peroxydicarbonate (Peroyl IPP, manufactured by NOF), bis-4-butylcyclohexyl peroxydicarbonate (Peroyl TCP, manufactured by NOF), diethoxy peroxydicarbonate (Peroyl EEP, manufactured by NOF), diethoxyhexyl peroxydicarbonate (Peroyl OPP, manufactured by NOF), hexyl peroxydicarbonate (Perhexyl ND, manufactured by NOF), dimethoxybutyl peroxydicarbonate (Peroyl MBP, manufactured by NOF), bis(3-methoxy-3-methoxybutyl) peroxydicarbonate (Peroyl SOP, manufactured by NOF), hexyl peroxypivalate (Perhexyl PV, manufactured by NOF), amyl peroxypivalate (Luperox 546M75, manufactured by Atofina), butyl peroxypivalate (Perbutyl, manufactured by NOF) or trimethylhexanoyl peroxide (Peroyl 355, manufactured by NOF); peroxy dicarbonate compounds such as dimethyl hydroxybutyl peroxaneodecanoate (Luperox 610M75, manufactured by Atofina), amyl peroxyneodecanoate (Luperox 546M75, manufactured by Atofina) or butyl peroxyneodecanoate (Luperox 10M75, manufactured by Atofina); acyl peroxides such as 3,5,5-trimethylhexanoyl peroxide, lauryl peroxide or dibenzoyl peroxide; ketone peroxides; dialkyl peroxides; peroxyketals; or peroxide initiators such as hydroperoxide, and the like may be used, and as the photoinitiator, benzoin, hydroxy ketone, amino ketone or phosphine oxide photoinitiators and the like may be used and specifically, benzoin, benzoin methyl ether, benzoin ethyl ether, benzoin isopropyl ether, benzoin n-butyl ether, benzoin isobutyl ether, acetophenone, dimethyl anino acetophenone, 2,2-dimethoxy-2-phenylacetophenone, 2-hydroxy-2-methyl-1-phenylpropan-1-one, 1-hydroxycyclohexylphenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butyl anthraquinone, 2-amino anthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamino benzoic acid ester, oligo[2-hydroxy-2-methyl-1-[4-(1-methylvinyl)phenyl]propanone] and 2,4,6-trimethylbenzoyl-diphenyl-phosphine oxide, and the like, may be used, without being limited thereto.

As the initiator, those having a high solubility in the hydrophilic component can be selected and used, and for example, a hydroxyketone compound, a water-dispersible hydroxyketone compound, an amino ketone compound or a water-dispersible amino ketone compound can be used, without being limited thereto.

The hydrophilic polymerizable composition may comprise, for example, a radical initiator at a concentration of about 0.1% by weight to 10% by weight. Such a ratio can be changed, for example, in consideration of the physical properties of the film or polymerization efficiency, and the like.

For example, in consideration of physical properties for filming and the like, if necessary, the hydrophilic polymerizable composition may further comprise a cross-linking agent. As the cross-linking agent, for example, a compound having two or more radically polymerizable groups can be used.

As the compound which can be used as a cross-linking agent, a polyfunctional acrylate can be exemplified. The polyfunctional acrylate may mean a compound containing two or more acryloyl groups or methacryloyl groups.

As the polyfunctional acrylate, for example, a bifunctional acrylate such as 1,4-butanediol di(meth)acrylate, 1,6-hexanediol di(meth)acrylate, neopentyl glycol di(meth)acrylate, polyethyleneglycol di(meth)acrylate, neopentylglycol adipate di(meth)acrylate, hydroxyl puivalic acid neopentyl glycol di(meth)acrylate, dicyclopentanyl di(meth)acrylate, caprolactone modified dicyclopentenyl di(meth)acrylate, ethylene oxide modified di(meth)acrylate, di(meth)acryloxy ethyl isocyanurate, allylated cyclohexyl di(meth)acrylate, tricyclodecane dimethanol (meth)acrylate, dimethylol dicyclopentane di(meth)acrylate, ethylene oxide modified hexahydrophthalic acid di(meth)acrylate, tricyclodecanedimethanol (meth)acrylate, neopentylglycol modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate or tris(meth)acryloxyethylisocyanurate; a tetrafunctional acrylate such as diglycerin tetra(meth)acrylate or pentaerythritol tetra(meth)acrylate; a pentafunctional acrylate such as propionic acid modified dipentaerythritol penta(meth)acrylate; and a hexafunctional acrylate such as dipentaerythritol hexa(meth)acrylate, caprolactone modified dipentaerythritol hexa(meth)acrylate or urethane (meth)acrylate (e.g., a reaction product of an isocyanate monomer and trimethylolpropane tri(meth)acrylate) and the like may be used. In addition, as the polyfunctional acrylate, a compound termed a so-called photo-curable oligomer in the industry, such as urethane acrylate, epoxy acrylate, polyester acrylate or polyether acrylate and the like can be used. One or two or more of appropriate kinds among these compounds can be selected and used.

As the cross-linking agent, a component capable of realizing a cross-linking structure by a thermal curing reaction, such as known isocyanate cross-linking agents, epoxy cross-linking agents, aziridine cross-linking agents or metal chelate cross-linking agents as well as a component capable of realizing a cross-linking structure by a radical reaction, such as the above polyfunctional acrylate can be also used, if necessary.

The cross-linking agent may be contained, for example, in the hydrophilic polymerizable composition at a concentration of 50% by weight or less or 10% by weight to 50% by weight. The ratio of the cross-linking agent can be changed in consideration of, for example, physical properties of the film.

The hydrophilic polymerizable composition may further comprise other necessary components in addition to the above-described components. In addition, the method of forming the first region using the hydrophilic polymerizable composition will be described below.

The emulsion region can also be formed by polymerizing a polymerizable compound, for example, a radically polymerizable compound. For example, the emulsion region can be formed by polymerizing the radically hydrophobic polymerizable compound.

In one example, the emulsion region may comprise polymerized units of a compound represented by Formulas 5 to 7 below.

[Formula 5]

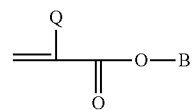

In Formula 5, Q is hydrogen or an alkyl group, and B is a linear or branched alkyl group having 5 or more carbon atoms, or an alicyclic hydrocarbon group.

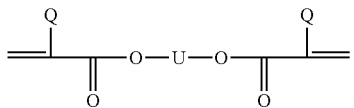

[Formula 6]

In Formula 6, Q is hydrogen or an alkyl group, and U is an alkylene, alkenylene or alkynylene group, or an arylene group.

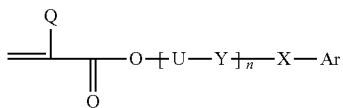

[Formula 7]

In Formula 7, Q is hydrogen or an alkyl group, U is an alkylene group, Y is a carbon atom, an oxygen atom or a sulfur atom, X is an oxygen atom, a sulfur atom or an alkylene group, Ar is an aryl group, and n is any number.

In the present application, the term alkenylene group or alkynylene group may mean an alkenylene group or alkynylene group having 2 to 20 carbon atoms, 2 to 16 carbon atoms, 2 to 12 carbon atoms, 2 to 8 carbon atoms, or 2 to 4 carbon atoms, unless otherwise specified. The alkenylene group or alkynylene group may be linear, branched or cyclic. In addition, the alkenylene or alkynylene group may be optionally substituted with one or more substituents.

In the present application, the term "arylene group" may mean a divalent residue derived from a compound containing a structure in which benzene or two or more benzenes are condensed or bonded, or a derivative thereof, unless otherwise specified. The arylene group may have, for example, a structure including benzene, naphthalene or fluorene, and the like.

In Formula 5, B may be a linear or branched alkyl group having 5 or more carbon atoms, 7 or more carbon atoms, or 9 or more carbon atoms. Thus, the compound containing a relatively long alkyl group has been known as a relatively nonpolar compound. The upper limit of the carbon atom number in the linear or branched alkyl group is not particularly limited, and for example, the alkyl group may be an alkyl group having 20 or less carbon atoms.

In another example, in Formula 5, B may be an alicyclic hydrocarbon group, for example, an alicyclic hydrocarbon group having 3 to 20 carbon atoms, 3 to 16 carbon atoms or 6 to 12 carbon atoms, and examples of such a hydrocarbon group may include a cyclohexyl group or an isobornyl group and the like. Thus, the compound having an alicyclic hydrocarbon group has been known as a relatively nonpolar compound.

In Formula 7, n is any number and can be, for example, each independently a number within a range of 1 to 20, 1 to 16, or 1 to 12.

The second region can be formed, for example, by polymerizing a hydrophobic polymerizable composition comprising a radically hydrophobic polymerizable compound and a radical initiator. Accordingly, the second region may be a polymer of the hydrophobic polymerizable composition.

The kind of the radically hydrophobic polymerizable compound contained in the hydrophobic polymerizable composition is not particularly limited and a compound known as a so-called nonpolar monomer in the industry can be used. For example, as the compound, the above-described compounds can be used.

The kind of the radical initiator contained in the hydrophobic polymerizable composition is not particularly limited. For example, among the initiators described in the item of the hydrophilic polymerizable compound as described above, an appropriate kind can be selected and used.

The hydrophobic polymerizable composition may comprise, for example, a radical initiator at a concentration of 5% by weight or less. Such a concentration can be changed, for example, in consideration of physical properties of the film or polymerization efficiency.

Considering physical properties for filming and the like, if necessary, the hydrophobic polymerizable composition may further comprise a cross-linking agent as well. The cross-linking agent is not particularly limited, and for example, among the components described in the item of the hydrophilic polymerizable composition, suitable components may be selected and used.

For example, the cross-linking agent may be contained in the hydrophobic polymerizable composition at a concentration of 50% by weight or less, or 10 to 50% by weight. The concentration of the cross-linking agent can be changed in consideration of, for example, the physical properties of the film or the influence on other components contained in the polymerizable compound.

The hydrophobic polymerizable composition may further comprise other components if necessary. In addition, the method of forming the emulsion region using the hydrophobic polymerizable composition will be described below.

The light-emitting layer may further comprise other components in addition to the above-mentioned components. Examples of the other components include, but are not limited to, known surfactants, or amphipathic nanoparticles, antioxidants or scattering particles to be described below.

The light-emitting layer may comprise amphipathic nanoparticles, and such amphipathic nanoparticles may be present, for example, in one or more of the matrix and the emulsion region, and suitably at the boundary of the matrix and the emulsion region. The amphipathic nanoparticles can increase the stability of the matrix and the emulsion region phase-separated in the light-emitting layer.

In one example, the amphipathic nanoparticles may comprise a core part comprising nanoparticles and a shell part comprising an amphipathic compound surrounding the nanoparticles. Here, the amphipathic compound is a compound containing a hydrophilic site and a hydrophobic site at the same time, and some compounds are also known in the art as so-called surfactants. For example, when the nanoparticle of the core part is hydrophobic, the hydrophilic site of the amphipathic nanoparticle of the shell part faces the core and the hydrophobic site is disposed externally, so that the amphipathic nanoparticles may be formed overall, and conversely, when the nanoparticle of the core part is hydrophilic, the hydrophobic site of the amphipatic nanoparticle of the core part faces the core and the hydrophilic site is disposed externally, so that the amphipathic nanoparticles may be formed overall. Here, although the nanoparticles of the cor part may have an average particle size within a range of, for example, about 10 nm to 1000 nm, it may be changed according to purposes, without being particularly limited. As the nanoparticles of the core part, for example, metal particles such as gold, silver, copper, platinum, palladium, nickel, manganese or zinc; oxide particles such as $SiO_2$, $Al_2O_3$, $TiO_2$, ZnO, NiO, CuO, $MnO_2$, MgO, SrO or CaO, or particles made of a polymer such as PMMA (polymethacrylate) or PS (polystyrene) can be used.

In addition, as the amphipathic compound of the shell part, Triton X-114 (CAS No. 9036-19-5), Triton X-100 (CAS No. 92046-34-9), Brij-58 (CAS No. 92046-34-9), octyl glucoside (CAS No. 29836-26-8), octylthio glucoside (CAS No. 85618-21-9), decaethylene glycol monodecyl ether (CAS No. 9002-92-0), N-decanoyl-N-methylglucamine (CAS No. 85261-20-7), decyl maltopyranoside (CAS No. 82494-09-5), N-dodecyl maltoside (CAS No. 69227-93-6), nonaethylene glycol monododecyl ether (CAS No. 3055-99-0), N-nonanoyl-N-methylglucamine (CAS No. 85261-19-4), octaethylene glycol monododecyl ether (CAS No. 3055-98-9), Span 20 (CAS No. 1338-39-2), polyvinylpyrrolidone (CAS No. 9003-39-8) or Synperonic F108 (PEO-b-PPO-b-PEO, CAS No. 9003-11-06) can be used, without being limited thereto.

The amphiphilic nanoparticle may comprise the amphipathic compound in such a range that stability of the matrix and the emulsion region can be ensured. For example, the ratio of the amphipathic compound in the amphiphilic nanoparticles may be about 5% by weight to 30% by weight, but the range may be changed as long as stability between the matrix and the emulsion region can be suitably ensured.

The method of incorporating the amphiphilic nanoparticles into the light-emitting layer, for example, the method of positioning the amphiphilic nanoparticles at the boundary of the matrix and the emulsion region is not particularly limited, and for example, a method of formulating the amphipathic nanoparticles in a mixture in a process of preparing the light-emitting layer to be described below can be used.

In one example, the amphipathic nanoparticle may have a refractive index from those of the matrix and the emulsion region. When such amphipathic nanoparticles are positioned at the boundary of the matrix and the emulsion region, for example, the generation efficiency of white light can be further increased by scattering or diffusion of light with the nanoparticles.

Here, the degree of difference in refractive indexes of the matrix and the emulsion region with the nanoparticles may be set in an appropriate range in consideration of the desired scattering or diffusing effects of light, where the specific range thereof is not particularly limited. For example, the absolute value of the difference in refractive index between the nanoparticles and the matrix and the absolute value of the difference in refractive index between the nanoparticles and the emulsion region may be in the range of 0.05 to 0.5, respectively. The refractive index of the nanoparticles is not particularly limited as long as it satisfies the above range, and for example, may be in the range of 1.0 to 2.0. In the present specification, the term refractive index is a value measured for light having a wavelength of about 550 nm, unless otherwise specified.

The proportion of the amphipathic nanoparticles in the light-emitting layer can be selected in consideration of the stability of the matrix and the emulsion region, for example. In one example, the amphipathic nanoparticles may be present at a concentration of 1% by weight to 10% by weight, based on the total weight of the matrix and emulsion region or the light-emitting layer.

As the amphipathic nanoparticles, those sold under the product name of MX 80H by Soken, those sold under the product name of XX-43BQ, XX-128BQ, XX-130BQ, XX-50BQ, XX-131 BQ, MBX-2H, MBX-30, SSX-104, XXS-105, SSX-108, SSX-110, XX-129BQ or XX-99BQ and the like by Sekisui, and those sold under the product name of MIBX-SD-L, MIBK-SD, MIBK-ST or TOL-ST and the like by Nissan may be also applied.

The light-emitting layer may also contain an antioxidant, and such a component may be particularly useful when the quantum dot is applied as the light-emitting nanoparticle. Although the quantum dots have a property that if exposed to oxygen, they are deteriorated to lower light emission capability, when the above-mentioned antioxidant is contained in the light-emitting layer in such a case, the light-emitting nanoparticles can be protected. As the antioxidant, for example, an oxidizing metal, a phenol antioxidant, a thioether antioxidant, a phosphate antioxidant or an amine-based antioxidant such as a hindered amine-based antioxidant may be used. The antioxidant may be contained in any of the above-mentioned matrix or emulsion region.

Accordingly, the light-emitting layer may comprise oxidizing metal particles or oxides of the metal particles. The oxidizing metal particle may mean a metal capable of reacting with oxygen to form an oxide, and an alkali metal, an alkaline earth metal or a transition metal or the like may be also applied, if it is oxidizing. The metal reacts with oxygen in the light-emitting layer to form an oxide, whereby the light-emitting nanoparticles can be protected. The usable oxidizing metal is not particularly limited as long as it can react with oxygen to form an oxide. The oxidizing metal may include, but is not limited to, Pt, Au, Ag, or Ce. The size of the metal particles can be controlled in consideration of reactivity with oxygen, and can generally have an average particle diameter within a range of about 10 nm to 10,000 nm.

The proportion of the oxidizing metal particles or oxides thereof in the light-emitting layer can be selected in consideration of, for example, reactivity with oxygen, curability of the light-emitting layer material, and light-emitting property of the light-emitting layer. In one example, the oxidizing metal particles may be present in the light-emitting layer at a ratio of about 0.01% by weight to 1% by weight. If necessary, known dispersants for dispersing the oxidizing metal particles may be used together.

The light-emitting layer may also comprise, as an antioxidant, a phenol-based antioxidant, a thioether-based antioxidant, a phosphate-based antioxidant, or an amine-based antioxidant such as a hindered amine-based antioxidant. The specific kind of each antioxidant is not particularly limited and known materials can be applied.

The proportion of the antioxidant in the light-emitting layer can also be selected in consideration of, for example, reactivity with oxygen, curability of the light-emitting layer material, and light-emitting property of the light-emitting layer. In one example, the antioxidant may be present in the light-emitting layer at a ratio of about 0.01% by weight to 1% by weight.

The light-emitting layer may also comprise scattering particles. The scattering particles included in the light-emitting layer can improve the optical characteristics of the light-emitting layer by controlling a probability that light incident on the light-emitting layer is introduced into the light-emitting nanoparticles. In the present specification, the term scattering particles may mean any type of particle that may have not only a refractive index different from that of the surrounding medium, e.g., the matrix or the emulsion region, but also an appropriate size to scatter, refract, or diffuse the incident light. For example, the scattering particles may have low or high refractive indexes relative to the surrounding medium, e.g., the matrix and/or the emulsion region, and may be particles having the absolute value of the difference in refractive index with the matrix and/or the emulsion region of 0.2 or more, or 0.4 or more. The upper limit of the absolute value of the refractive index difference is not particularly limited, and may be, for example, about 0.8 or less or about 0.7 or less. The scattering particles may have a mean particle diameter of, for example, 10 nm or more, 100 nm or more, more than 100 nm, 100 nm to 20000 nm, 100 nm to 15000 nm, 100 nm to 10000 nm, 100 nm to 5000 nm, 100 nm to 1000 nm or 100 nm to 500 nm or so. The scattering particles may have a shape such as a sphere, an ellipse, a polyhedron or an amorphous shape, but the shape is not particularly limited. As the scattering particles, for example, particles comprising organic materials such as polystyrene or a derivative thereof, an acrylic resin or a derivative thereof, a silicone resin or a derivative thereof, or a novolac resin or a derivative thereof, or inorganic materials such as silica, alumina, titanium oxide or zirconium oxide can be exemplified. The scattering particles may be formed by comprising only one of the above materials or two or more of the above materials. For example, as the scattering particles, hollow particles such as hollow silica or particles having a core-shell structure can be used. The ratio of the scattering particles in the light-emitting layer is not particularly limited and may be selected at a proper ratio, for example, in consideration of the path of light incident on the light-emitting layer.

The scattering particles may be included, for example, in the matrix or the emulsion region. In one example, the scattering particles may be contained only in any one region of the matrix and the emulsion region, but may not be present in the other region. Here, the region in which the scattering particles are not present may mean, as a region substantially not containing the corresponding particles, the case where the weight ratio of the scattering particles in the region is 10% or less, 8% or less, 6% or less, 4% or less, 2% or less, 1% or less, or 0.5% or less. In one example, when the light-emitting nanoparticles are contained only in any one region of the matrix and the emulsion region, the scattering particles may exist only in a region not containing the light-emitting nanoparticles.

The scattering particles can be contained in the light-emitting layer at a ratio of, for example, 10 to 100 parts by weight relative to 100 parts by weight of the total weight of the matrix or the emulsion region, and appropriate scattering characteristics can be ensured within such a ratio.

Also, the light-emitting layer may further comprise additives, such as an oxygen scavenger or a radical scavenger, in the required amounts.

The thickness of the light-emitting layer is not particularly limited, and may be selected within an appropriate range in consideration of the intended use and optical characteristics. In one example, the light-emitting layer may have a thickness within a range of 10 to 500 μm, 10 to 400 μm, 10 to 300 μm, or 10 to 200 μm, but is not limited thereto.

The light-emitting layer as above can be produced, for example, by polymerizing a layer comprising a mixture of a hydrophilic polymerizable composition and a hydrophobic polymerizable composition. Here, as the hydrophilic and hydrophobic polymerizable compositions, for example, the above-described composition, that is, a composition comprising a radically hydrophilic or hydrophobic polymerizable compound and an initiator can be used, respectively. In addition, the mixture may be prepared by separately preparing hydrophilic and hydrophobic polymerizable compositions, respectively, and then mixing them, or by mixing the components constituting the hydrophilic and hydrophobic polymerizable compositions at a time. When such a mixture is polymerized, phase separation occurs in the polymerization process, and the above-described light-emitting layer can be formed. The method of forming the layer containing the mixture is not particularly limited. For example, the layer can be formed by coating the obtained mixture on a suitable substrate with a known coating method. Also, the method of curing the layer formed by the above method is not particularly limited, and for example, may be performed by a method of applying such an appropriate range of heat that the initiator contained in each composition can be activated, or applying electromagnetic waves such as ultraviolet.

The light-emitting layer, for example, the light-emitting layer containing quantum dots as the light-emitting nanoparticles, is vulnerable to external factors such as water, moisture, and oxygen. Therefore, when the light-emitting layer is exposed to the external factors, the performance of the light-emitting nanoparticles is deteriorated. In the case where the cutting or tailoring process is applied in the process of forming the light-emitting layer, the side of the light-emitting layer acts as an infiltration path of the external factors such as oxygen.

Accordingly, the light-emitting film of the present application has a structure comprising a blocking film existing on the side of the light-emitting layer. Here, the blocking film may be present on all sides of the light-emitting layer. In addition, the blocking film may be also present on the upper portion and/or the lower portion of the light-emitting layer as well as on the side of the light-emitting layer. In one example, the light-emitting layer may be sealed to the whole surface by the blocking film.

In the present application, the term blocking film may mean any kind of layer that exhibits an intended range of water vapor transmission rate (WVTR) and/or oxygen transmission rate (OTR).

For example, the blocking film may mean a layer having a water vapor transmission rate of 10 $g/m^2/day$ or less, 8 $g/m^2/day$ or less, 6 $g/m^2/day$ or less, 4 $g/m^2/day$ or less, 2 $g/m^2/day$ or less, 1 $g/m^2/day$ or less, 0.5 $g/m^2/day$ or less, 0.3 $g/m^2/day$ or less, or 0.1 $g/m^2/day$ or less at a temperature of 40° C. and a relative humidity of 90%. The lower the value of the water vapor transmission rate is, it means that the corresponding layer exhibits more excellent barrier properties, and thus the lower limit of the water vapor transmission rate is not particularly limited. In one example, the lower limit of the water vapor transmission rate may be at least 0.001 $g/m^2/day$, at least 0.005 $g/m^2/day$, at least 0.01 $g/m^2/day$, at least 0.02 $g/m^2/day$, at least 0.03 $g/m^2/day$, at least 0.05 $g/m^2/day$, or at least 0.06 $g/m^2/day$. The water vapor transmission rate can be measured, for example, by ISO 15106-3 or ASTM F-1249 standard.

On the other hand, the blocking film may have an oxygen transmission rate (OTR) of 1 $cc/m^2/day$ or less, 0.8 $cc/m^2/day$ or less, 0.6 $cc/m^2/day$ or less, 0.4 $cc/m^2/day$ or less, 0.2 $cc/m^2/day$ or less, 0.1 $cc/m^2/day$ or less, 0.05 $cc/m^2/day$ or less, 0.03 $cc/m^2/day$ or less, or 0.01 $cc/m^2/day$ or less at any one temperature within a range of 25° C. to 30° C. and any one relative humidity within a range of 70% to 80%. The lower the value of the oxygen transmission rate is, it means that the corresponding layer exhibits more excellent blocking properties, and thus the lower limit of the oxygen transmission rate is not particularly limited. For example, the oxygen transmission rate was measured according to ASTM D-3985 standard.

In the present application, the blocking film can be formed by using a known material known to be able to block external factors, particularly moisture or oxygen and the like. For example, the blocking film may include a metal, an oxide, a nitride, an oxynitride, a fluoride, polysilazane, or an oxygen absorber.

As the metal, aluminum (Al) or the like may be exemplified, the oxide may include a metal oxide such as $TiO_2$, $Ti_3O_3$, $Al_2O_3$, MgO, SiO, $SiO_2$, GeO, NiO, CaO, BaO, $Fe_2O_3$, $Y_2O_3$, $ZrO_2$, $Nb_2O_3$ and $CeO_2$, the nitride may include a metal nitride such as SiN, the oxynitride may include a metal oxynitride such as SiON, and the fluoride may include a metal fluoride such as $MgF_2$, LiF, $AlF_3$ and $CaF_2$, without being limited thereto. The blocking film may be formed by applying the above material to an appropriate method, for example, a deposition method or a coating method.

In addition, the kind of the oxygen absorber is not particularly limited, and a compound known to have an oxygen absorbing function can be used without limitation. For example, as the oxygen absorber, a type to show an oxygen absorbing function through an oxidation reaction of unsaturated carbon or a type to show an oxygen absorbing function by photosensitive dye oxidation can be used. Such an oxygen absorber can be exemplified by a sulfite compound, vitamin E, vitamin C, tocopherol, or an unsaturated double bond-containing compound. Here, as the unsaturated double bond-containing compound, for example, squalene, a fatty acid compound or polybutadiene and the like can be exemplified, and such a compound may be used, if necessary, with an appropriate amount of a transition metal catalyst or ultraviolet sensitizer (UV sensitizer) and the like. Therefore, the blocking film containing the oxygen absorber may further comprise the transition metal catalyst and/or ultraviolet sensitizer.

In one example, the blocking film may comprise a barrier film and an oxygen absorber. In this case, the oxygen absorber may be included in the barrier film or in an oxygen absorbing film laminated with the barrier film.

In the case where the blocking film comprises the blocking film and the oxygen absorbing film, the order of arrangement thereof in the light-emitting film is not particularly limited. However, in order to ensure proper performance, the oxygen absorbing film may be formed adjacent to the light-emitting layer as compared with the barrier film. In addition, the blocking film may comprise one or more oxygen blocking films and one or more barrier films, and for example, the blocking film may be also a structure that one oxygen absorbing film is present between two barrier films.

In the present application, the term barrier film may mean, for example, all kinds of layers exhibiting a water vapor transmission rate (WVTR) in the above-mentioned range. In addition, when the barrier film is combined with an oxygen absorber, excellent barrier performance can be exhibited even when the water vapor transmission rate of the barrier film itself is high to some extent.

The kind of the barrier film of the present application is not particularly limited as long as the film exhibits the above-mentioned range of water vapor transmission rate. Barrier films formed using materials known to be able to block external factors such as moisture are variously known in the industry, and all of such known barrier films can be applied in the present application.

For example, the barrier film may comprise a material capable of exhibiting barrier properties (hereinafter, a barrier material), such as a metal, an oxide, a nitride, an oxynitride, or a fluoride. The specific types of the metal, oxide, nitride, oxynitride or fluoride are as described above. The barrier film may comprise only the barrier material alone, or may comprise the barrier material and other materials together.

Here, the material that can be included in the barrier film together with the barrier material may include a matrix resin capable of retaining the barrier material. Generally, the barrier film can be produced in a manner to form a film of the barrier material on a suitable base film. Here, although the film of the barrier material is generally formed by, for example, a vapor deposition method, the barrier film may be also formed by a method of coating a coating liquid containing the barrier material and the matrix resin in addition to such a vapor deposition method.

As an example of the base film to be applied to the barrier film having the above structure, a polyolefin film such as a polyethylene film or a polypropylene film, a cycloolefin polymer (COP) film such as a polynorbonene film, a polyester film such as a PC (polycarbonate) film or a PET (poly(ethylene terephthalate)) film, a cellulose ester-based polymer film such as a polyvinyl chloride film, a polyacrylonitrile film, a polysulfone film, a polyacrylate film, a polyvinyl alcohol film or a TAC (triacetyl cellulose) film, or a copolymer film of two or more of monomers from monomers forming the above polymer, and the like can be exemplified, without being limited thereto.

If the barrier film has a structure comprising the base film and the layer of the barrier material existing on the surface thereof as described above, the layer of the barrier material may be disposed close to the light-emitting layer, when the barrier film is formed on the side, the upper portion and/or the lower portion of the light-emitting layer.

The shape of the barrier material is not particularly limited and may be adjusted so as to exhibit appropriate barrier properties. For example, the barrier material may be a plate such as nanoclay, but is not limited thereto. In addition, the barrier film can be formed using a material that can be converted to an oxide through suitable treatment, such as polysilazane, or a plate-like material such as nanoclay, and in this case, can be also formed by a method of coating a coating liquid that the material is dispersed in a suitable matrix resin, in addition to the vapor deposition method.

The thickness of the above barrier film is not particularly limited and can be adjusted in consideration of the desired barrier performance. For example, the thickness of the barrier film may be about 100 μm or less, 90 μm or less, 80 μm or less, 70 μm or less, 60 μm or less, 50 μm or less, 40 μm or less, 30 μm or less, 20 μm or less, or 15 μm or less. The lower limit of the thickness of the barrier film is not particularly limited, and for example, the thickness may be about 5 μm or more. Here, for example, when the barrier film is formed into a multi-layer structure by comprising a protective coating layer, or other layers such as a base film, the thickness of the barrier film means a thickness of the layer exhibiting barrier properties (e.g., layer of metal, oxide, nitride, oxynitride or polysilazane) itself, and a thickness that does not include the thickness of the other elements, for example, the protective coating layer, or the layer such as the base film.

The blocking film may comprise the barrier film alone, or may comprise an oxygen absorber together with the barrier film. The oxygen absorber may be contained in the barrier film or may be laminated on one surface of the barrier film in the form of a separate layer. In the present application, the layer comprising the oxygen absorber may be referred to as an oxygen absorbing film. The specific types of oxygen absorbers usable in the present application are as described above.

In order to incorporate the oxygen absorber into the inside of the barrier film, a method of forming a barrier film by depositing the oxygen absorber together in a deposition process of the aforementioned barrier material, by depositing the barrier material on the surface where the oxygen absorber is present or by dispersing the oxygen absorber together in a coating liquid comprising the aforementioned barrier material may be used.

When the oxygen absorber is contained in the oxygen absorbing film, the oxygen absorbing film may be formed by a coating method using a coating liquid prepared by dispersing the oxygen absorber in a suitable resin matrix, or a method that the oxygen absorbing film is formed by applying a raw material containing the resin matrix and the oxygen absorber in a filming method such as extruding, and then the oxygen absorbing film is laminated with the barrier film may be used, or a method that the oxygen absorbing film is directly formed on the barrier film by a method such as the coating or extruding may be applied.

The oxygen absorbing film formed by such a method may further comprise a resin component derived from the resin matrix. The resin component that can be contained in the oxygen absorbing film is not particularly limited, and for example, a component capable of effectively retaining the oxygen absorber and capable of maintaining optical transparency can be used. As such a resin component, polyester, polyacrylate, polyolefin, polycarbonate, polyimide or the like can be used.

It is possible that the oxygen absorbing film can exhibit a scattering function by adjusting the refractive index of each component in the oxygen absorbing film comprising the resin component and the oxygen absorber, if necessary. For example, the absolute value of the difference between the refractive index of the oxygen absorber contained in the oxygen absorbing film and the refractive index of the resin component may be about 0.01 or more. The oxygen absorbing film exhibits an appropriate haze due to the difference of the refractive index in such a range, so that the scattering function can be ensured. In the present application, the refractive index may mean a refractive index measured for light having a wavelength of about 550 nm, unless otherwise specified.

The ratio of the oxygen absorber in the oxygen absorbing film or the barrier film is not particularly limited. The ratio of the oxygen absorber in the oxygen absorbing film can be adjusted in consideration of the kind of the oxygen absorber to be used, the thickness of the oxygen absorbing film, the kind of other components included together with the oxygen absorber, such as the resin component, and the like.

For example, the ratio of the oxygen absorber in the oxygen absorbing film or the barrier film can be adjusted so that the absorbing film or the barrier film can exhibit an oxygen transmission rate (OTR) in the above-mentioned range.

For example, the oxygen absorber in the oxygen absorbing film may generally be contained in a ratio of 2 to 400 parts by weight relative to 100 parts by weight of the resin component. The ratio is illustrative, in which the ratio can be changed in consideration of the kind of the oxygen absorber or the desired performance, and the like.

Also, the thickness of such an oxygen absorbing film is not particularly limited, and may be adjusted so as to be capable of exhibiting the oxygen transmission rate in the above range depending on the material of the oxygen absorbing film.

In one example, the blocking film may have a reflectance of 80% or more, 85% or more, 90% or more, or 95% or more for any one wavelength or the entire wavelength within the range of 400 nm to 760 nm. The higher the value is, the more appropriate the reflectance is, and the upper limit is not particularly limited. For example, the reflectance may be 100% or less. The light incident into the inside of the light-emitting film can be appropriately reflected in the inside of the film through controlling the reflectance of the blocking film, thereby improving the light-emitting efficiency of the light-emitting film.

FIG. 1 is a cross-sectional view of an exemplary light-emitting film, and shows a structure in which blocking films (102) exist on the sides of a light-emitting layer (101), and the blocking films also exist on the upper and lower portions of the light-emitting layer (101). The blocking films present on the upper and lower portions of the light-emitting layer (101) are a structure comprising the layer (1031) of the barrier material and the base film (1032).

If necessary, the refractive index of each element included in the above structure can be adjusted. By controlling the refractive index as described above, the light incident into the inside of the light-emitting film can be appropriately reflected in the inside of the film, thereby improving the light-emitting efficiency of the light-emitting film.

The light-emitting film may comprise, as an additional layer, for example, a reflective layer on the upper portion of the light-emitting layer. For example, when the light-emitting film comprises the blocking film, the reflective layer may be included on the upper portion thereof or between the light-emitting layer and the blocking film, and the like. As the reflective layer, for example, a reflective layer in which the wavelength of the reflected light is in the range of 420 nm to 490 nm can be used. Here, the wavelength of the reflected light means a wavelength of the light that can be reflected by the reflective layer. For example, when the light-emitting layer comprises the above-mentioned green particles and red particles in an appropriate amount, the light-emitting layer may be configured so that white light is finally emitted by converting at least a part of incident blue light, that is, light in a wavelength range of 420 nm to 490 nm, into green light and red light. At this time, if a reflective layer capable of reflecting blue light is introduced, it is possible to more efficiently generate the white light by controlling the probability that the incident blue light can meet green particles or red particles.

As the reflective layer, a known layer can be used as long as it has the wavelength of the above-mentioned reflected light. As such a reflective layer, for example, a cholesteric liquid crystal layer or a lyotropic liquid crystal layer, and the like can be exemplified, without being limited thereto.

The light-emitting film may also comprise, as an additional layer, for example, an optically anisotropic layer present on the upper portion of the reflective layer. The optically anisotropic layer may play a role in adjusting color characteristics of light generated in the light-emitting film, for example, color coordinates and the like.

In one example, the optically anisotropic layer may have an in-plane retardation for light having a wavelength of 550 nm in a range of 100 nm to 350 nm. Here, the in-plane retardation is a value calculated by Equation 1 below.

$$Rin = d \times (Nx - Ny) \qquad \text{[Equation 1]}$$

In Equation 1, Rin is an in-plane retardation, d is a thickness of the optically anisotropic layer, Nx is a refractive index of the optically anisotropic layer for light having a wavelength of 550 nm in the slow axis direction, Ny is a refractive index of the optically anisotropic layer for light having a wavelength of 550 nm in the fast axis direction.

The optically anisotropic layer may have a half-wavelength or quarter-wavelength phase delay characteristic. In this specification, the term "n-wavelength phase delay characteristic" can mean a characteristic that the incident light can be phase-delayed by n times the wavelength of the incident light within at least a part of the wavelength range. For example, if the optically anisotropic layer has a half phase delay characteristic, the in-plane retardation for light having a wavelength of 550 nm may be in the range of 200 nm to 290 nm or 220 nm to 270 nm, and if the optically anisotropic layer has a quarter phase delay characteristic, the in-plane retardation for light having a wavelength of 550 nm may be in the range of 110 nm to 220 nm or 140 nm to 170 nm.

The optically anisotropic layer may be a polymer film, for example, a stretched polymer film, or a liquid crystal film. As the polymer film, for example, a film in which a light-transmitting polymer film capable of imparting optical anisotropy by stretching is stretched in an appropriate manner can be used. A non-stretched polymer film can also be used, as long as it has optical anisotropy. As an example of the polymer film, a polyolefin film such as a polyethylene film or a polypropylene film, a cycloolefin polymer (COP) film such as a polynorbonene film, a cellulose ester-based polymer film such as a polyvinyl chloride film, a polyacrylonitrile film, a polysulfone film, a polyacrylate film, a polyvinyl alcohol film or a TAC (triacetyl cellulose) film, or a copolymer film of two or more monomers from the monomers forming the polymer, and the like can be exemplified, without being limited thereto. As the liquid crystal film, a film formed by polymerizing a reactive liquid crystal compound called a so-called RM (reactive mesogen) in a suitable manner can be used. Various kinds of polymer films or liquid crystal films which exhibit such an in-plane retardation have been known in this field, and all of these films can be used in the present application.

In addition, the light-emitting film may further comprise a polarizing layer. The polarizing layer may be present on the upper portion of the optically anisotropic layer. In this case, the angle formed by the optical absorption axis of the polarizing layer and the optical axis (for example, the slow axis) of the optically anisotropic layer may be in a range of about 0 to 90 degrees. By disposing the optically anisotropic layer and the polarizing layer in such a range, the color characteristics of light emitted from the light-emitting film can be controlled.

As the polarizing layer, known materials can be used without any particular limitation. The polarizing layer may be a functional element capable of extracting light that vibrates in one direction from incident light that vibrates in various directions. As such a polarizing layer, for example, a typical polarizing layer such as a PVA (poly(vinyl alcohol)) polarizing layer can be used, or a polarizing coating layer such as a lyotropic liquid crystal layer (LLC layer) or a host-guest liquid crystal layer comprising a reactive liquid crystal compound and a dichroic dye, and the like can be used, without being limited thereto.

The light-emitting film may further comprise other configurations besides each configuration as described above. As the layer that can be further included in the light-emitting film, for example, a brightness enhancement film or various optical films comprising a prism sheet or the like, which may be present on the upper portion of the optically anisotropic layer, or a barrier film which may be present on one or both surfaces, or the sides of the light-emitting layer, and the like can be exemplified, without being limited thereto.

The present application also relates to an illumination device. An exemplary illumination device may comprise a light source and the light-emitting film. In one example, the light source and the light-emitting film in the illumination device may be disposed such that the light irradiated from the light source can enter into the light-emitting film. Here, the light-emitting layer included in the light-emitting film may be disposed in the illumination device closer than the CLC layer. If the light irradiated from the light source enters into the light-emitting film, a part of the incident light may be emitted as it is, without being absorbed by the light-emitting nanoparticles in the light-emitting film, and the other part may be emitted as light having other wavelengths after being absorbed by the light-emitting nanoparticles. Accordingly, the color purity or color of the light emitted from the light-emitting film can be controlled by controlling the wavelength of the light emitted from the light source and the wavelength of the light emitted by the light-emitting nanoparticles. Furthermore, in the present application, blue light can be reflected by the CLC layer on the upper portion of the light-emitting layer to enter into the light-emitting layer again, so that the light-emitting efficiency of the light-emitting layer can be further improved.

The type of the light source included in the illumination device of the present application is not particularly limited, and an appropriate type can be selected in consideration of the type of the intended light. In one example, the light source is a blue light source, and may be, for example, a light source capable of emitting light in a wavelength range of 420 to 490 nm.

FIGS. 2 and 3 are diagrams illustratively showing an illumination device comprising the light source and the light-emitting film as described above.

As shown in FIGS. 2 and 3, the light source and the light-emitting film in the illumination device may be disposed such that the light irradiated from the light source can enter into the light-emitting film. In FIG. 2, the light source (401) is disposed below the light-emitting film (402), so that the light irradiated from the light source (401) in the upward direction can enter into the light-emitting film (402).

FIG. 3 is a case where the light source (401) is disposed on the side of the light-emitting film (402). Although not essential, when the light source (401) is disposed on the side of the light-emitting film (402) as described above, other means, such as a light guiding plate (501) or a reflective plate (502), for allowing light from the light source (401) to enter into the light-emitting film (402) more efficiently may be also included.

The example shown in FIGS. 2 and 3 is one example of an illumination device of the present application, and besides, the illumination device may have various known types and may further comprise various known configurations for this purpose.

The illumination device of the present application can be used in various applications. In a typical application to which the illumination device of the present application may be applied, there is a display device. For example, the illumination device can be used as a BLU (Backlight Unit) of a display device such as an LCD (Liquid Crystal Display).

In addition, the illumination device may be used in a BLU (backlight unit) of a display device such as a computer, a mobile phone, a smart phone, a personal digital assistant (PDA), a gaming device, an electronic reading device or a digital camera, indoor or outdoor lighting, stage lighting, decorative lighting, accent lighting, or museum lighting, and the like, and besides, it may be used in special wavelength lighting required for horticulture or biology, and the like, but the application to which the illumination device can be applied is not limited to the above.

Advantageous Effects

The present application can provide a light-emitting film which can effectively produce the desired light, for example, white light, and stably maintain its performance for a long period of time, and a use thereof.

BRIEF DESCRIPTION OF DRAWINGS

FIG. 1 is a cross-sectional view of an exemplary light-emitting film.

FIGS. 2 and 3 are schematic diagrams of an exemplary illumination device.

FIGS. 4 to 9 are photographs of the light-emitting film produced in Examples.

FIGS. 10 and 11 are photographs of the light-emitting film prepared in Comparative Example 1.

FIG. 12 is a view showing the durability evaluation results of the light-emitting films of Examples and Comparative Examples.

DESCRIPTION OF SYMBOLS

101: light-emitting layer
102: blocking film
1031: layer of barrier material
1032: base film
401: light source
402: light-emitting film
501: light guiding plate
502: reflective plate

MODE FOR INVENTION

Hereinafter, the light-emitting film or the like of the present application will be specifically described by way of examples and comparative examples, but the scope of the light-emitting film or the like is not limited to the following examples.

1. Measurement of Reflectance

The reflectance of the blocking film was evaluated as follows. That is, it was evaluated using a measuring equipment (F10-RT from filmetrics) according to a manual of the manufacturer after depositing the same material as one forming the blocking film in the same thickness and by the same manner as those of the blocking film applied on a substrate (PET, poly(ethyleneterephthalate))

2. Evaluation of Water Vapor Transmission Rate and Oxygen Transmission Rate

The water vapor transmission rate (WVTR) mentioned in the examples was measured by ISO 15106-3 or ASTM F-1249 standard, and the oxygen transmission rate (OTR) was measured according to ASTM D-3985 standard.

3. Evaluation of Durability

The durability of the light-emitting films prepared in Examples or Comparative examples was evaluated by irradiating one surface of the light-emitting film with light after leaving the film in a dark state at a temperature of 80° C. for a predetermined time and measuring the brightness change rate of light emitted from the other surface. Here, the brightness was evaluated using a measuring apparatus (spectrometer, SR-UL2, Topcon).

Preparation Example 1. Preparation of Light-Emitting Layer (A)

PEGDA (poly(ethyleneglycol) diacrylate, CAS No.: 26570-48-9, solubility parameter (HSP): about 18 $(cal/cm^3)^{1/2}$), LA (lauryl acrylate, CAS No.: 2156-97-0, solubility parameter (HSP): about 8 $(cal/cm^3)^{1/2}$), bisfluorene diacrylate (BD, CAS No.: 161182-73-6, solubility parameter (HSP): about 9 $(cal/cm^3)^{1/2}$), green quantum dots (light-emitting nanoparticles), a surfactant (MX 80-H, manufactured by Soken) and $SiO_2$ nanoparticles were mixed in a weight ratio of 9:1:1:0.2:0.05:0.05 (PEGDA:LA:BD:green particles:surfactant:$SiO_2$ nanoparticles). Subsequently, Irgacure 2959 and Irgacure 907 as radical initiators were mixed at a concentration of about 1% by weight, respectively, and stirred for about 6 hours to prepare a mixture A. Apart from the above, PEGDA (poly(ethyleneglycol) diacrylate, CAS No.: 26570-48-9, solubility parameter (HSP): about 18 $(cal/cm^3)^{1/2}$), LA (lauryl acrylate, CAS No.: 2156-97-0, solubility parameter (HSP): about 8 $(cal/cm^3)^{1/2}$), bisfluorene diacrylate (BD, CAS No.: 161182-73-6, solubility parameter (HSP): about 9 $(cal/cm^3)^{1/2}$), red quantum dots (light-emitting nanoparticles), a surfactant (MX 80-H, manufactured by Soken) and $SiO_2$ nanoparticles were mixed in a weight ratio of 9:1:1:0.02:0.05:0.05 (PEGDA:LA:BD:red particles:surfactant:$SiO_2$ nanoparticles). Subsequently, Irgacure 2959 and Irgacure 907 as radical initiators were mixed at a concentration of about 1% by weight, respectively, and stirred for about 6 hours to prepare a mixture B. The mixtures A and B were formulated in the same weight ratio to prepare a coating liquid, and the coating liquid was located in a thickness of about 100 μm between two sheets of barrier films (i-component) spaced apart at a predetermined interval, irradiated with ultraviolet to induce a radical polymerization and cured to form a light-emitting layer. FIGS. 4 and 5 are microscope photographs confirmed for the Examples. It can be seen from the drawings that the light-emitting layer has been formed, in which the emulsion region where light-emitting nanoparticles are present is dispersed and present in the matrix by phase separation.

Preparation Example 2. Preparation of Light-Emitting Layer (B)

PEGDA (poly(ethyleneglycol) diacrylate, CAS No.: 26570-48-9, solubility parameter (HSP): about 18 $(cal/cm^3)^{1/2}$), LA (lauryl acrylate, CAS No.: 2156-97-0, solubility parameter (HSP): about 8 $(cal/cm^3)^{1/2}$), bisfluorene diacrylate (BD, CAS No.: 161182-73-6, solubility parameter (HSP): about 9 $(cal/cm^3)^{1/2}$), green quantum dots (light-emitting nanoparticles), a surfactant (MX 80-H, manufactured by Soken) and $SiO_2$ nanoparticles were mixed in a weight ratio of 9:1:1:0.1:0.05:0.05 (PEGDA:LA:BD:green particles:surfactant:$SiO_2$ nanoparticles). Subsequently, Irgacure 2959 and Irgacure 907 as radical initiators were mixed at a concentration of about 1% by weight, respectively, and stirred for about 6 hours to prepare a mixture. The mixture was located in a thickness of about 100 μm between two sheets of barrier films (i-component) spaced apart at a predetermined interval, irradiated with ultraviolet to induce a radical polymerization and cured to form a light-emitting layer. FIG. 6 is a microscope photograph of the light-emitting layer formed by the above method. It can be seen from the drawing that the light-emitting layer has been formed, in which the emulsion region where light-emitting nanoparticles are present is dispersed and present in the matrix by phase separation.

Example 1

Aluminum was vapor-deposited on the side of the light-emitting film (a light-emitting film comprising a light-emitting layer existing between two sheets of barrier films (i-component)) prepared in Preparation Example 2 to form a blocking film. The deposition was performed at a temperature of about 110° C. and the blocking film was deposited to a thickness of about 200 nm. As a result of measuring the reflectance of the blocking film formed of aluminum, the reflectance was found to be about 90% to 92% in the entire range of 400 to 780 nm. FIGS. 7 to 9 are photographs of the prepared light-emitting film, and FIGS. 8 and 9 are photographs in which the side blocking film is enlarged and displayed.

Comparative Example 1

A light-emitting film was prepared in the same manner as Example 1, except that a blocking film was not formed on the side. FIGS. 10 and 11 are photographs of the above-prepared light-emitting film.

Test Example 1

As a result of evaluating the durability of the light-emitting films prepared in Example 1 and Comparative Example 1, it was confirmed that in the case of Comparative Example 1, the brightness was drastically decreased over time and durability was not ensured, but in the case of Example 1, the brightness was stably ensured for a long time.

Example 2

Preparation of Blocking Film

As the oxygen absorber, a composition blending a proper amount of a cobalt catalyst with a resin composition in which polybutadiene and polyethylene were mixed in a weight ratio (polybutadiene:polyethylene) of about 4:1 was used. An oxygen absorbing film was prepared by applying the composition to an extrusion method to form a layer having a thickness of about 30 μm. The oxygen absorbing film was laminated with a known barrier film to prepare a blocking film. As the barrier film, a barrier film having a type that an Al2O3 deposited layer having a thickness of about 100 nm and a protective coating layer having a thickness of about 1 μm are formed on one surface of a PET (poly (ethylene terephthalate) film (thickness: about 12 μm) (water vapor transmission rate (WVTR): about 0.08 g/m2/day (a temperature of 40° C. and a relative humidity of 90%), oxygen transmission rate (OTR): about 0.3 cc/m2/day (a temperature of 30° C. and a relative humidity of 70%)) (barrier film A) was used. A blocking film was prepared by laminating the prepared oxygen absorbing film on one surface of the barrier film A.

Preparation of Light-Emitting Film

A light-emitting film was prepared by forming a blocking film in the same manner as in Example 1 on the side of the light-emitting layer prepared in Preparation Example 2 and laminating the prepared blocking film on the upper portion and the lower portion again such that the oxygen absorbing film was adjacent to the light-emitting layer relative to the barrier film.

Example 3

A light-emitting film was prepared in the same manner as in Example 2, except that a blocking film was prepared by using a barrier film having a type that an SiOx deposited layer having a thickness of about 100 nm and a protective coating layer having a thickness of about 1 μm are formed on one surface of a PET (poly(ethylene terephthalate) film (thickness: about 12 μm) (water vapor transmission rate (WVTR): about 0.08 g/m2/day (a temperature of 40° C. and a relative humidity of 90%), oxygen transmission rate (OTR): about 0.1 cc/m2/day (a temperature of 25° C. and a relative humidity of 80%)) (barrier film B) and laminating the oxygen absorbing film prepared in Example 2 with the barrier film B.

Comparative Example 2

A light-emitting film was prepared in the same manner as in Example 2, except that only the blocking film A of Example 2 was laminated on the upper portion and the lower portion of the light-emitting layer without forming a blocking film on the side.

Comparative Example 3

A light-emitting film was prepared in the same manner as in Example 2, except that only the blocking film B of Example 3 was laminated on the upper portion and the lower portion of the light-emitting layer without forming a blocking film on the side.

Comparative Example 4

A light-emitting film was prepared in the same manner as in Comparative Example 2, except for using only a barrier film having a type that an SiOx deposited layer having a thickness of about 100 nm and a protective coating layer having a thickness of about 1 μm are formed on one surface of a PET (poly(ethylene terephthalate) film (thickness: about 125 μm) (water vapor transmission rate (WVTR): about 0.021 g/m2/day (a temperature of 38° C. and a relative humidity of 90%), oxygen transmission rate (OTR): about 0.061 cc/m2/day (a temperature of 23° C. and a relative humidity of 0%)) (barrier film C).

Comparative Example 5

A light-emitting film was prepared in the same manner as in Comparative Example 2, except for using only a barrier film having a type that a mixed deposited layer of SiOx and ZnO having a thickness of about 100 nm and a protective coating layer having a thickness of about 1 μm are formed on one surface of a PET (poly(ethylene terephthalate) film (thickness: about 50 μm) (water vapor transmission rate (WVTR): about 0.019 to 0.036 g/m2/day (a temperature of 38° C. and a relative humidity of 90%), oxygen transmission rate (OTR): about 0.042 cc/m2/day (a temperature of 23° C. and a relative humidity of 0%)) (barrier film D).

Comparative Example 6

A light-emitting film was prepared in the same manner as in Comparative Example 2, except for using a blocking film prepared by laminating the oxygen absorbing layer prepared in Example 2 on one surface of a PET (poly(ethylene terephthalate)) film having no barrier property.

Test Example 2

Results of evaluating the durability, measured by the above manner, of the light-emitting films prepared in Examples and Comparative Examples were described in FIG. 12. Reviewing the drawing, in the case of Comparative Examples 2 to 5 in which only the barrier film was applied without applying the side blocking film, although the lower the water vapor transmission rate of the barrier film was, excellent durability was exhibited, satisfactory durability was not ensured even in any case, and in the case of Comparative Example 6 applied by only the oxygen absorbing film, no excellent durability was also shown. In the case of Examples 2 and 3 in which the blocking film combined with the barrier film having high water vapor transmission rate over the barrier films of Comparative Examples 4 and 5, and the oxygen absorbing film, was applied, and formed on the side, the stable durability was rather shown for a long time.

The invention claimed is:

1. A light-emitting film comprising a light-emitting layer comprising light-emitting nanoparticles and a binder; and a blocking film present on the left and right side of said light-emitting layer,
   wherein the binder comprises two regions including a continuous phase matrix and an emulsion region dispersed in said matrix, and phase-separated from each other,
   wherein one of the two regions comprises polymerized units of hydrophilic polymerizable compounds and the other region comprises polymerized units of hydrophobic polymerizable compounds, and
   wherein the light-emitting nanoparticles are contained in one of the continuous phase matrix or the emulsion region.

2. The light-emitting film according to claim 1, further comprising a blocking film located on the upper surface or the lower surface of the light-emitting layer.

3. The light-emitting film according to claim 1, wherein the blocking film comprises a metal, an oxide, a nitride, an oxynitride, a fluoride, polysilazane, or an oxygen absorber.

4. The light-emitting film according to claim 1, wherein the blocking film comprises Al, $TiO_2$, $Ti_3O_3$, $Al_2O_3$, MgO, SiO, $SiO_2$, GeO, NiO, CaO, BaO, $Fe_2O_3$, $Y_2O_3$, $ZrO_2$, $Nb_2O_3$, $CeO_2$, SiN, SiON, $MgF_2$, LiF, $A_lF_3$ or $CaF_2$.

5. The light-emitting film according to claim 3, wherein the oxygen absorber is a sulfite compound, vitamin E, vitamin C, tocopherol or an unsaturated double bond-containing compound.

6. The light-emitting film according to claim 5, wherein the unsaturated double bond-containing compound is squalene, a fatty acid compound or polybutadiene.

7. The light-emitting film according to claim 3, wherein the blocking film comprising the oxygen absorber further comprises a transition metal catalyst or an ultraviolet sensitizer.

8. The light-emitting film according to claim 1, wherein the blocking film comprises a barrier film and an oxygen absorber.

9. The light-emitting film according to claim 8, wherein the oxygen absorber is contained in the inside of the barrier film or contained in an oxygen absorbing film which is included together with the barrier film in the blocking film.

10. The light-emitting film according to claim 1, wherein the blocking film has a reflectance of 80% or more for any one wavelength within a range of 400 nm to 760 nm.

11. The light-emitting film according to claim 1, wherein the light-emitting nanoparticles are contained in the emulsion region.

12. The light-emitting film according to claim 11, wherein the proportion of the light-emitting nanoparticles contained in the emulsion region is 90% by weight or more of the total light-emitting nanoparticles contained in the light-emitting layer.

13. The light-emitting film according to claim 1, wherein the light-emitting nanoparticles are quantum dots.

14. An illumination device comprising a light source and the light-emitting film of claim 1, wherein said light source and light-emitting film are disposed such that light from said light source can enter into said light-emitting film.

15. A display device comprising the illumination device of claim 14.

* * * * *